United States Patent
Thomas

(10) Patent No.: US 9,849,573 B2
(45) Date of Patent: Dec. 26, 2017

(54) BROKEN BOLT EXTRACTOR

(71) Applicant: Marvin Thomas, St. Louis, MO (US)

(72) Inventor: Marvin Thomas, St. Louis, MO (US)

( * ) Notice: Subject to any disclaimer, the term of this patent is extended or adjusted under 35 U.S.C. 154(b) by 238 days.

(21) Appl. No.: 14/832,113

(22) Filed: Aug. 21, 2015

(65) Prior Publication Data

US 2016/0046008 A1    Feb. 18, 2016

Related U.S. Application Data

(63) Continuation-in-part of application No. 14/245,436, filed on Apr. 4, 2014, now Pat. No. 9,352,459.

(51) Int. Cl.
 *B25B 27/18* (2006.01)
 *B23G 5/20* (2006.01)
 *B23B 51/08* (2006.01)

(52) U.S. Cl.
 CPC .............. *B25B 27/18* (2013.01); *B23B 51/08* (2013.01); *B23G 5/20* (2013.01); *B23B 2251/64* (2013.01)

(58) Field of Classification Search
 CPC ..... B25B 27/18; B25B 51/0081; B25B 51/05; B25B 51/08; B25B 2251/242; B25B 2251/64
 See application file for complete search history.

(56) References Cited

U.S. PATENT DOCUMENTS

| | | | | |
|---|---|---|---|---|
| 1,863,045 A | * | 6/1932 | Norman et al. | B25B 27/18 81/441 |
| 2,752,671 A | * | 7/1956 | Alyea | B25B 27/18 29/240 |
| 3,263,533 A | * | 8/1966 | Carlson | B25B 27/18 81/441 |
| 3,346,894 A | * | 10/1967 | Lemelson | B23B 51/08 318/162 |
| 3,654,690 A | * | 4/1972 | Hardin | B25B 27/18 29/240 |
| 4,078,458 A | * | 3/1978 | Berendzen | B23B 51/08 29/240 |
| 4,350,064 A | * | 9/1982 | Markle | B25B 13/481 81/177.2 |
| 4,536,108 A | * | 8/1985 | Saxton | B23B 51/02 408/226 |
| 4,604,917 A | | 8/1986 | Polonsky | |
| 4,777,850 A | | 10/1988 | Polonsky | |
| 4,831,902 A | | 5/1989 | McClure | |
| 5,031,487 A | | 7/1991 | Polonsky | |
| 5,251,516 A | * | 10/1993 | Desaulniers | B25B 27/18 7/158 |
| 5,458,444 A | * | 10/1995 | Duncan | B23B 51/05 408/206 |
| 5,562,371 A | * | 10/1996 | Reed | B23G 5/062 408/222 |
| 6,868,756 B2 | * | 3/2005 | Kozak | B25B 27/18 81/441 |
| 7,152,509 B2 | * | 12/2006 | McCalley, Jr. | B25B 27/18 81/441 |

(Continued)

*Primary Examiner* — David B Thomas
(74) *Attorney, Agent, or Firm* — David H. Chervitz

(57) ABSTRACT

A broken bolt extractor is disclosed having a counter clockwise cutting tip section for drilling a bore into a broken bolt, a tap section having counter clockwise orientated threads, an intermediate shaft section, a chuck end portion, and a channel formed in the tip section, the tap section, and the shaft section.

20 Claims, 4 Drawing Sheets

(56) References Cited

U.S. PATENT DOCUMENTS

| | | | | |
|---|---|---|---|---|
| 7,971,508 B2* | 7/2011 | Kozak | ............ | B25B 27/18 81/441 |
| 8,215,206 B2* | 7/2012 | Kozak | ............ | B23B 51/00 81/441 |
| 8,276,482 B2* | 10/2012 | Kozak | ............ | B23B 51/00 81/441 |
| 8,485,066 B2* | 7/2013 | Kozak | ............ | B23B 51/00 81/441 |
| 8,567,028 B2* | 10/2013 | Shevela | ......... | B25B 27/0035 29/235 |
| 8,739,658 B2* | 6/2014 | Kozak | ............ | B23B 51/00 81/441 |
| 8,955,415 B2* | 2/2015 | Lin | ............ | B25B 27/18 81/441 |
| 2002/0152599 A1* | 10/2002 | Pai | ............ | B25B 27/18 29/426.1 |
| 2003/0136228 A1* | 7/2003 | Liu | ............ | B25B 27/18 81/53.2 |
| 2010/0154185 A1* | 6/2010 | Schallert | ........ | B25B 27/18 29/270 |
| 2014/0238202 A1* | 8/2014 | Roscosky | ........ | B25B 27/18 81/53.2 |
| 2015/0075331 A1* | 3/2015 | Catalano | ........ | B25B 27/18 81/53.2 |

* cited by examiner

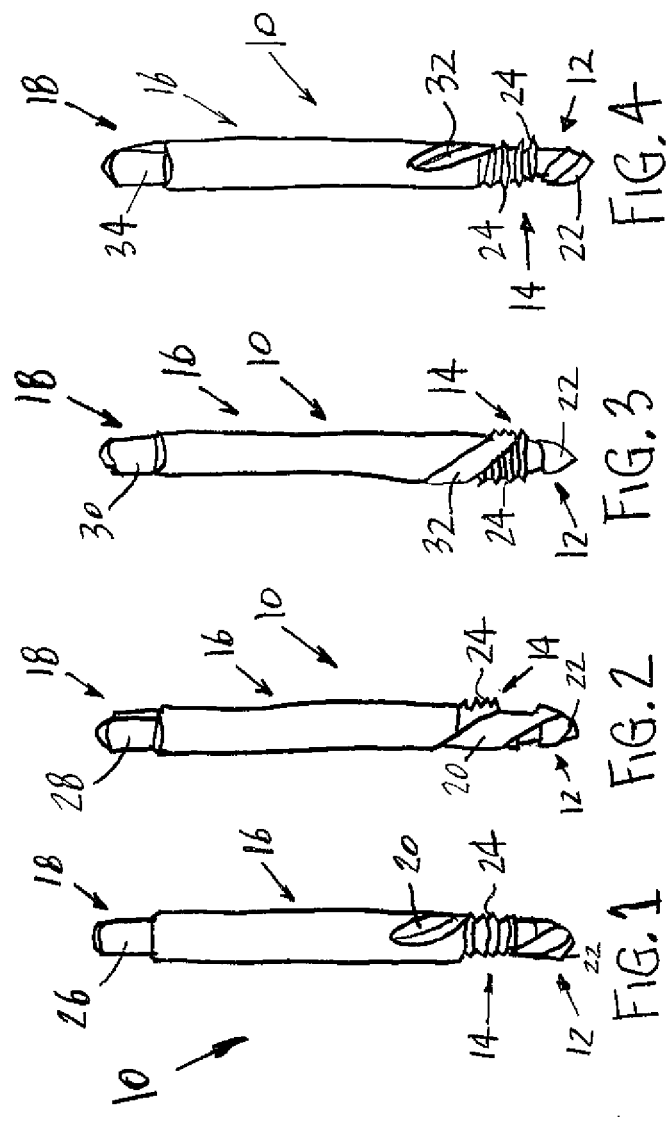

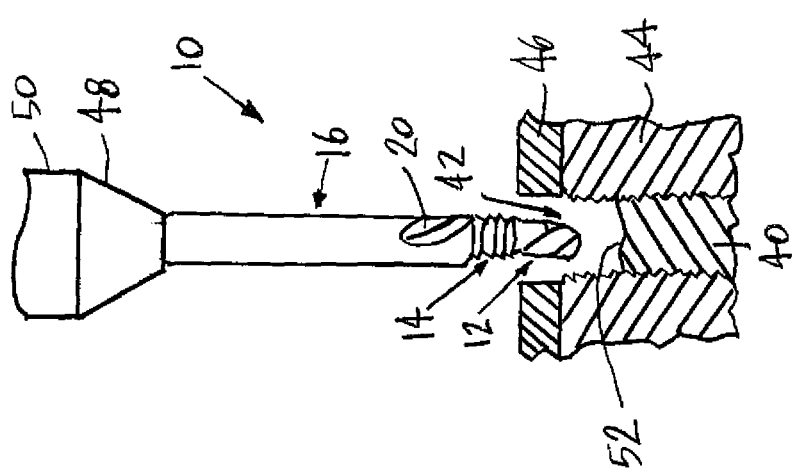

BROKEN BOLT EXTRACTOR

CROSS REFERENCE TO RELATED APPLICATIONS

This application is a continuation-in-part of U.S. patent application Ser. No. 14/245,436 filed on Apr. 4, 2014.

BACKGROUND

This disclosure relates generally to a tool for removal of a broken bolt, and more particularly to a broken bolt extractor for removing a portion of a threaded fastener that remains lodged in a threaded bore.

Bolts, such as bolts having sizes M8 to M14, have a bolt head and a threaded bolt stud or body. Due to the construction of a bolt, the bolt head may become separated or break off from the threaded bolt stud when attempting to remove the bolt. If this occurs then separation of the bolt head from the stud will leave the stud or a portion of a stud in a threaded bolt bore. Removing the broken bolt or stud is a cumbersome and difficult process. There have been several devices or methods developed in an effort to assist in removing the broken bolt. For example, one prior device requires that a separate drill bit be used to drill a hole in the stud. Once a hole is drill to a sufficient depth in the stud a second tool is used to be inserted into the drilled hole to extract the stud portion from the bore within which the stud portion is lodged or stuck. One problem associated with this process is that the drill bit breaks during the drilling process and becomes lodged in the stud. Instead of solving a problem another problem is encountered in that now the broken drill bit needs to be removed. Further, using a separate drill bit sometimes will rotate the stud body deeper into the threaded bore. This makes removal of the broken bolt stud even more difficult. Another prior device combines a drill bit with a bolt stud extractor in a single tool. However, this prior device requires that the bolt stud extractor be placed on a threaded tool shaft and the bolt stud extractor rotates during use until it becomes lodged in the stud to be extracted.

One problem associated with this use of this device is that it is capable of coming off the threaded tool shaft during use. If this occurs, then the problem of having to remove the bolt stud extractor lodged in the stud body is encountered. Again, not only is the broken bolt not removed but the broken tool now has to be removed. It would be desirable to avoid encountering a situation in which the tool is required to be extracted from the broken bolt. Further, the drill bit portion of this device is very small and may not drive deep enough into the broken bolt section for the extractor to grip enough of the broken bolt section.

The present disclosure is designed to obviate and overcome many of the disadvantages and shortcomings experienced with prior bolt extractors. Moreover, the present disclosure is related to a broken bolt extractor that can be easily manipulated or employed to remove broken bolts of various sizes. The broken bolt extractor of the present disclosure is also simple to use due to the extractor only being a single tool or device that does not require any moving parts attached to the extractor.

SUMMARY

In one form of the present disclosure, a broken bolt extractor is disclosed which comprises a counter clockwise cutting tip section for drilling a bore into a broken bolt, a tap section having counter clockwise orientated threads, an intermediate shaft section, a chuck end portion, and a channel formed in the tip section, the tap section, and the shaft section In another form of the present disclosure, a broken bolt extractor comprises a counter clockwise cutting tip section for drilling a bore into a broken bolt, a tap section having counter clockwise orientated threads, an intermediate shaft section, a chuck end portion, a first channel formed in the tip section, the tap section, and the shaft section, and a second channel formed in the tip section, the tap section, and the shaft section with the second channel formed on a side opposite to the first channel.

In still another form of the present disclosure, a broken bolt extractor comprises a counter clockwise cutting tip section for drilling a bore into a broken bolt, a tap section having threads for tapping into a broken bolt with the threads being counter clockwise orientated, an intermediate shaft section, and a chuck end portion for attachment to a tool for rotating the extractor.

In light of the foregoing comments, it will be recognized that the broken bolt extractor of the present disclosure is of simple construction and design and which can be easily employed with highly reliable results.

The present disclosure provides a broken bolt extractor that can remove a portion of a bolt left in a threaded bore.

The present disclosure provides a broken bolt extractor that is easy to use, store, and transport to a work site.

The present disclosure provides a broken bolt extractor that is lightweight, compact, and durable.

The present disclosure also provides a broken bolt extractor that can be constructed using readily available materials.

The present disclosure also provides a broken bolt extractor that allows a broken bolt to be removed in a single operation.

The present disclosure is also directed to a broken bolt extractor that has a cutting bit section that is long enough to drill into a broken bolt section.

The present disclosure further provides a broken bolt extractor that is of a single piece construction and does not have any moving parts threaded to the broken bolt extractor.

The present disclosure is also directed to a broken bolt extractor that has a channel for removing any pieces or fragments of a broken bolt during a removal procedure.

These and other advantages of the present disclosure will become apparent after considering the following detailed specification in conjunction with the accompanying drawings, wherein:

BRIEF DESCRIPTION OF THE DRAWINGS

FIG. 1 is a perspective view of a broken bolt extractor constructed according to the present disclosure;

FIG. 2 is a perspective view of the broken bolt extractor shown in FIG. 1 turned to the left one quarter turn or 90° from view shown in FIG. 1;

FIG. 3 is a perspective view of the broken bolt extractor shown in FIG. 2 turned to the left one quarter turn or 90° from view shown in FIG. 2;

FIG. 4 a perspective view of the broken bolt extractor shown in FIG. 3 turned to the left one quarter turn or 90° from view shown in FIG. 3;

FIG. 5 is a partial cross-sectional view of the broken bolt extractor being drilled into a broken bolt portion for forming a bore therein;

DETAILED DESCRIPTION OF THE PREFERRED EMBODIMENTS

Figure 6:
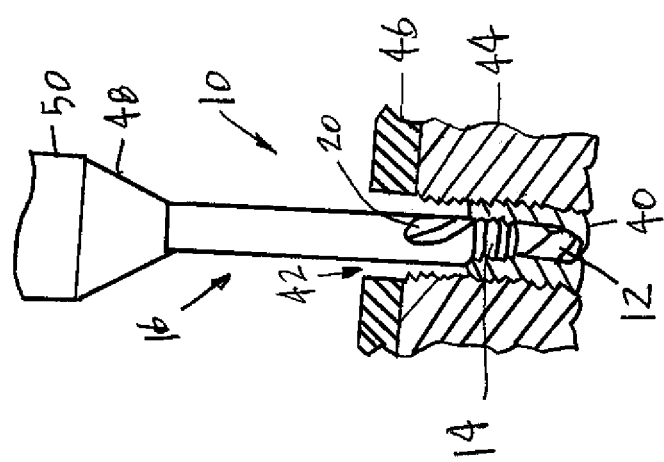
FIG. 6 is a partial cross-sectional view of the broken bolt extractor being drilled into a broken bolt portion with a tap section engaging a side of the broken bolt portion.

Referring now to the drawings, wherein like numbers refer to like items, number 10 identifies a preferred embodiment of a broken bolt extractor constructed according to the present disclosure. Referring now to FIG. 1, the broken bolt extractor 10 is shown to comprise a counter clockwise cutting tip section 12, a tap section 14, an intermediate shaft section 16, a chuck end portion 18, and a first channel 20 formed in the tip section 12, the tap section 14, and the shaft section 16. The chuck end portion 18 is used for attachment to a tool (not shown) for rotating the broken bolt extractor 10. The tip section 12 is used to cut into a broken bolt section deep enough before the tap section 14 enters into a bore that has been drilled by the cutting tip section 12. The cutting tip section 12 has left-handed or counter clockwise cutting threads 22 formed therein. Since most, if not all, broken bolt portions to be removed have right hand or clockwise threads, the counter clockwise cutting threads 22 will cut into the broken bolt portion without tighten the broken portion further in place. The tap section 14 is used to tap into the broken bolt to grip the broken bolt for removal. The tap section 14 also has threads 24 that are capable of tapping or threading into the broken bolt section. The threads 24 are counter clockwise cut threads which when tapped into the broken bolt section will not tighten the broken bolt portion further in place. The threads 24 are disposed radially about the extractor 10. As will be explained in detail further herein, the threads 24 are partially disposed radially around the tap section 14. The shaft section 16 is straight and has the first 20 channel extending into the shaft section 16. The first channel 20 is used to allow any debris or fragments from the broken bolt section or portion to be removed to facilitate the cutting tip section 12 and the tap section 14 cutting into and grasping the broken bolt section or portion. Although a first channel 20 is shown, it is possible that the extractor 10 may be made without the first channel 20. The chuck end portion 18 is squared off to be held in a chuck of a tool, such as a drill. The chuck end portion 18 has a first face 26. It is also contemplated that the portion 18 may take on any other suitable shape such as a hexagonal socket end to facilitate insertion into a chuck of a tool. The shaft section 16 has a length that extends or takes up a large portion of the extractor 10.

FIG. 2 illustrates the broken bolt extractor 10 turned to the left one quarter turn or 90° so that a second face 28 of the chuck end portion 18 is shown. The broken bolt extractor 10 is shown to comprise the counter clockwise cutting tip section 12, the tap section 14, the intermediate shaft section 16, and the chuck end portion 18. The first channel 20 is depicted as continuing from the shaft section 16 through the tap section 14 and the cutting tip section 12. As can be appreciated, the first channel 20 extends from the cutting tip section 12, through the tap section 14, and ends in the shaft section 16. This allows any fragments or debris to travel through the first channel 20 from the cutting tip section 12, the tap section 14, and out at the shaft section 16. Since the first channel 20 extends through the tap section 14, the threads 24 are only partially formed around the extractor 10.

The threads 24 do not completely encircle the extractor 10. However, if no first channel 20 is formed in the extractor 10, then the threads 24 will extend completely around or radially about the tap section 14 of the extractor 10. The cutting tip section 12 has the left-handed or counter clockwise cutting threads 22 formed therein. Also, the tap section 14 has the threads 24 formed in the tap section 14.

Referring now to FIG. 3, the broken bolt extractor 10 has again been turned to the left one quarter turn or 90° so that a third face 30 of the chuck end portion 18 is presented. The broken bolt extractor 10 is shown to comprise the counter clockwise cutting tip section 12, the tap section 14, the intermediate shaft section 16, and the chuck end portion 18. The broken bolt extractor 10 also has a second channel 32 formed therein that spans or spirals from the shaft section 16 through the tap section 14 and the cutting tip section 12. As can be appreciated, the second channel 32 extends from the cutting tip section 12, through the tap section 14, and ends in the shaft section 16. This allows any fragments or debris to travel through the second channel 32 from the cutting tip section 12, the tap section 14, and out at the shaft section 16. With the second channel 32 extending through the tap section 14, the threads 24 are only partially formed around the extractor 10. The threads 24 do not completely encircle the extractor 10. The second channel 32 is formed in the extractor opposite to the first channel 20. Although a second channel 32 has been shown, it is contemplated that the extractor 10 may be constructed having only the first channel 20 or no channel at all. The cutting tip section 12 has the left-handed or counter clockwise cutting threads 22 formed therein. Also, the tap section 14 has the threads 24 formed in the tap section 14.

FIG. 4 illustrates the broken bolt extractor 10 being turned to the left one more quarter turn or 90° to expose a fourth side 34 of the chuck end portion 18. In this particular orientation, the broken bolt extractor 10 is shown to comprise the counter clockwise cutting tip section 12, the tap section 14, the intermediate shaft section 16, and the chuck end portion 18. The broken bolt extractor 10 also has the second channel 32 formed therein that ends in the shaft section 16. The second channel 32 ends in the shaft section 16 and curls down through the tap section 14 and ending in the cutting tip section 12. The cutting tip section 12 has the left-handed or counter clockwise cutting threads 22 formed therein. Also, the tap section 14 has the left-handed or counter clockwise threads 24 formed in the tap section 14. The faces 26, 28, 30, and 34 form the squared off chuck end portion 18. Again, although four faces 26, 28, 30, and 34 are shown, the chuck end portion may take on other shapes or configurations so that it can fit into a tool capable of rotating the extractor 10.

Referring now to FIG. 5, the broken bolt extractor 10 is shown prior to being drilled into a broken bolt section, portion, fragment, or stud 40 left or stuck in a threaded bore hole 42 in a support surface 44. For example, the broken bolt section 40 may be a bolt in an automobile that has been broken off and in order to repair the automobile the broken bolt section 40 must be removed. Another surface 46 is shown and the surface 46 is typically mated to the support surface 44 by the bolt (not shown) that has been broken. The broken bolt extractor 10 is shown being inserted into a chuck 48 of a power drill 50. The chuck end portion 18 is mechanically coupled in the chuck 48 to rotate the broken bolt extractor 10. As has been previously discussed, the chuck end portion 18 may have a socket end or the four faces 26, 28, 30, and 34 (not shown) having flat surfaces, such as a square shape, that enables the broken bolt extractor 10 to be mechanically gripped within the chuck 48. Also, a hand tool, such as a ratcheting socket wrench, a breaker bar, a nut driver, an open end wrench, or a box end wrench, may be used to rotate the broken bolt extractor 10. If the broken bolt section 40 is right-hand threaded then the broken bolt extractor 10 is rotated in the clockwise direction to drill the cutting tip section 12 of the broken bolt extractor 10 into the broken bolt section 40. Due to the cutting tip section 12 being a counter clockwise cutting section, the broken bolt section 40 will not be rotated further into the threaded bore hole 42. As can be appreciated, no prior drilling or preparation to an exposed top surface 52 of the broken bolt section 40 is required even if the exposed top surface 52 has an irregular shape. The broken bolt extractor 10 is also shown having the tap section 14, the intermediate shaft section 16, and the first channel 20 formed in the tip section 12, the tap section 14, and the shaft section 16.

FIG. 6 illustrates the broken bolt extractor 10 being drilled into the broken bolt section 40 and the tap section 14 tapping into the broken bolt section 40. Since the threads 24 of the tap section 14 are cut in a counter clockwise orientation, as the tap section 14 taps into the broken bolt section 40 the threads 24 will become lodged or locked into the broken bolt section 40 which will then be rotated in a counterclockwise direction. Rotating the broken bolt section 40 in a counterclockwise direction will loosen the broken bolt section 40 from within the threaded bore hole 42. This will remove the broken bolt section 40 from the threaded bore hole 42. The drill 50 is being rotated in the clockwise direction when this operation is taking place. Also, any debris generated by drilling into the broken bolt section 40 will be allowed to escape through the first channel 20 and the second channel 32, if the extractor 10 is fitted with one or more of the channels 20 and 32. As has been indicated above, there may be applications when the extractor 10 does not need a channel.

Figure 7:
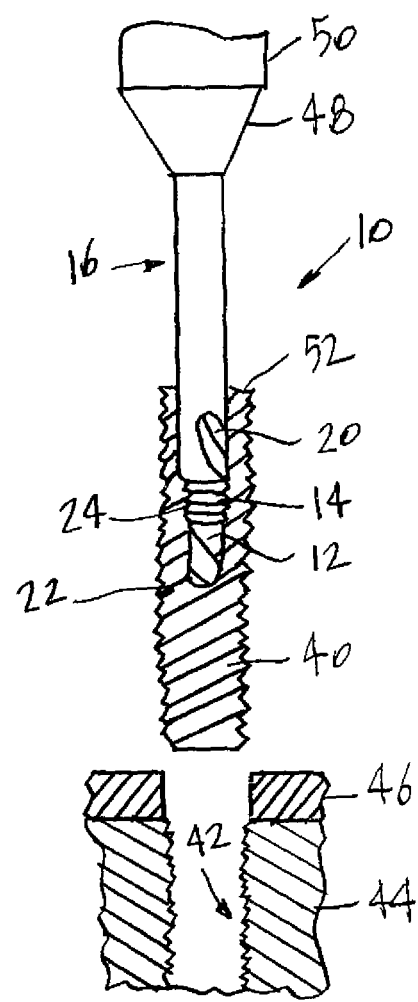
FIG. 7 is a partial cross-sectional view of the broken bolt extractor removing a broken bolt section completely out of a bore hole.

With particular reference now to FIG. 7, the broken bolt section 40 has been removed from the threaded bore hole 42. The broken bolt section 40 is still engaged with the broken bolt extractor 10 and can be removed therefrom in any suitable manner. For example, the broken bolt section 40 may be placed in a clamp or a vise and the drill 50 may be rotated in the counter clockwise direction and the broken bolt extractor 10 will be rotated out of the broken bolt section 40. Other methods may be used to remove or free the broken bolt section 40 from the broken bolt extractor 10.

As can be appreciated, the broken bolt extractor 10 is used to remove the broken bolt section 40 that has remained in the threaded bore hole 42 after a bolt head (not shown) has broken away from the broken bolt section 40. Once it is determined that the broken bolt section 40 needs to be extracted from the threaded bore hole 42, the broken bolt extractor 10 is placed into the chuck 48 of the drill 50 and secured in place. The cutting tip section 12 of the broken bolt extractor 10 is placed into the threaded bore hole 42 against the exposed top surface 52 of the broken bolt section 40. The drill 50 is operated to rotate the broken bolt extractor 10 in the clockwise direction and the cutting tip section 12 drills into the broken bolt section 40 in the counter clockwise direction. By drilling in the clockwise direction, the broken bolt section 40 is not tighten further in the threaded bore hole 42. The drilling operation continues and the tap section 14 comes into contact with the broken bolt section 40. Further rotation of the broken bolt extractor 10 will back out the broken bolt section 40 until the broken bolt section 40 is completely removed from the threaded bore hole 42. Once the broken bolt section 40 is extracted, the broken bolt section 40 may be removed from the broken bolt extractor 10. A new bolt may then be threaded into the threaded bore hole 42. With use of the broken bolt extractor 10, a broken bolt section 40 may be removed from a threaded bore hole 42 by use of a single tool using a single operation.

In the case where the broken bolt section 40 is left-hand threaded then the broken bolt extractor 10 will have the cutting tip section 12 having threads 22 that are cut in the clockwise direction and the tap section 14 will have threads 24 that are also cut in the clockwise direction. The extractor will be rotated in the counter clockwise direction to drill the cutting tip section 12 of the broken bolt extractor 10 into the broken bolt section 40. Due to the cutting tip section 12 being a clockwise cutting section, the broken bolt section 40 will not be rotated further into the threaded bore hole 42. Also, since the tap section 14 is cut having clockwise threads 24, the broken bolt section 40 will not be rotated into the threaded bore 42, but will be rotated out of the threaded bore 42. As the extractor 10 rotates, the broker bolt section 40 will be unscrewed.

Preferably, the broken bolt extractor 10 will be constructed of a material such as high carbon steel, high speed steel, cobalt steel alloys, tungsten carbide, or polycrystalline diamond so that the extractor 10 is easy to handle and use. Other materials or combination of materials may be used to construct the broken bolt extractor 10. The broken bolt extractor 10 may also be coated black oxide, titanium nitride, titanium aluminum nitride, titanium carbon nitride, and zirconium nitride. Further, other coatings may be used to coat the broken bolt extractor 10 to extend the life of the extractor 10.

From all that has been said, it will be clear that there has thus been shown and described herein a broken bolt extractor which fulfills the various objects and advantages sought therefor. It will be apparent to those skilled in the art, however, that many changes, modifications, variations, and other uses and applications of the subject broken bolt extractor are possible and contemplated. All changes, modifications, variations, and other uses and applications which do not depart from the spirit and scope of the disclosure are deemed to be covered by the disclosure, which is limited only by the claims which follow.

What is claimed is:

1. A broken bolt extractor comprising:
   a counter clockwise cutting tip section for drilling a bore into a broken bolt;
   a tap section having counter clockwise orientated threads;
   an intermediate shaft section;
   a chuck end portion; and
   a channel formed in the tip section, the tap section, and the intermediate shaft section.

2. The broken bolt extractor of claim 1 wherein the broken bolt extractor is constructed of a material such as high carbon steel, high speed steel, cobalt steel alloys, tungsten carbide, or polycrystalline diamond.

3. The broken bolt extractor of claim 1 wherein the intermediate shaft section is straight.

4. The broken bolt extractor of claim 1 wherein the chuck end portion has four faces for being gripped by a tool for rotating the extractor.

5. The broken bolt extractor of claim 1 wherein the channel is in the form of a spiral that begins in the intermediate shaft section and ends in the cutting tip section.

6. The broken bolt extractor of claim 1 wherein the tap section has partial threads for cutting into a broken bolt and the channel spirals through the tap section forming the partial threads of the tap section.

7. The broken bolt extractor of claim 1 wherein the intermediate shaft section has a length that extends a large portion of the extractor.

8. A broken bolt extractor comprising:
   a counter clockwise cutting tip section for drilling a bore into a broken bolt;
   a tap section having counter clockwise orientated threads;
   an intermediate shaft section;
   a chuck end portion;
   a first channel formed in the tip section, the tap section, and the intermediate shaft section; and
   a second channel formed in the tip section, the tap section, and the intermediate shaft section with the second channel formed in the extractor opposite to the first channel.

9. The broken bolt extractor of claim 8 wherein the broken bolt extractor is constructed of a material such as high carbon steel, high speed steel, cobalt steel alloys, tungsten carbide, or polycrystalline diamond.

10. The broken bolt extractor of claim 8 wherein the intermediate shaft section is straight.

11. The broken bolt extractor of claim 8 wherein the chuck end portion has four faces for being gripped by a tool for rotating the extractor.

12. The broken bolt extractor of claim 8 wherein the first channel is in the form of a spiral that begins in the intermediate shaft section and ends in the cutting tip section.

13. The broken bolt extractor of claim 8 wherein the second channel is in the form of a spiral that begins in the intermediate shaft section and ends in the cutting tip section.

14. The broken bolt extractor of claim 8 wherein the tap section has partial threads for cutting into a broken bolt and the first channel spirals through the tap section forming the partial threads of the tap section.

15. The broken bolt extractor of claim 8 wherein the tap section has partial threads for cutting into a broken bolt and the second channel spirals through the tap section forming the partial threads of the tap section.

16. A broken bolt extractor comprising:
   a counter clockwise cutting tip section for drilling a bore into a broken bolt;
   a tap section having threads for tapping into a broken bolt with the threads being counter clockwise orientated;
   an intermediate shaft section;
   a chuck end portion for attachment to a tool for rotating the extractor; and
   a channel formed in the tip section, the tap section, and the intermediate shaft section, the channel spirals from the tip section, through the tap section, and ending in the intermediate shaft section, the channel for removing any debris from the tip section and the tap section.

17. The broken bolt extractor of claim 16 wherein the chuck end portion has four faces for being gripped by a tool for rotating the extractor.

18. The broken bolt extractor of claim 16 wherein the intermediate shaft section is straight.

19. The broken bolt extractor of claim 16 wherein the broken bolt extractor is constructed of a material such as high carbon steel, high speed steel, cobalt steel alloys, tungsten carbide, or polycrystalline diamond.

20. The broken bolt extractor of claim 16 wherein the broken bolt extractor is coated with black oxide, titanium nitride, titanium aluminum nitride, titanium carbon nitride, or zirconium nitride.

* * * * *